(12) United States Patent
Schneider et al.

(10) Patent No.: US 7,867,081 B2
(45) Date of Patent: Jan. 11, 2011

(54) SYSTEM FOR JOIN-UP INCENTIVE MESSAGING AND BONUSING

(75) Inventors: Richard J. Schneider, Las Vegas, NV (US); Vincent S. Manfredi, Las Vegas, NV (US)

(73) Assignee: IGT, Las Vegas, NV (US)

( * ) Notice: Subject to any disclaimer, the term of this patent is extended or adjusted under 35 U.S.C. 154(b) by 1209 days.

(21) Appl. No.: 10/731,159

(22) Filed: Dec. 8, 2003

(65) Prior Publication Data

US 2005/0124411 A1   Jun. 9, 2005

(51) Int. Cl.
*A63F 9/24* (2006.01)
*G06Q 30/00* (2006.01)
*G06F 19/00* (2006.01)

(52) U.S. Cl. .............. 463/25; 463/42; 463/16; 463/40; 705/14.12

(58) Field of Classification Search .......... 463/25, 463/16, 42, 40; 705/14.12
See application file for complete search history.

(56) References Cited

U.S. PATENT DOCUMENTS

| | | | |
|---|---|---|---|
| 5,586,936 A | 12/1996 | Bennett et al. | |
| 5,655,961 A | 8/1997 | Acres et al. | |
| 5,702,304 A | 12/1997 | Acres et al. | |
| 5,833,540 A | 11/1998 | Miodunski et al. | |
| 6,302,793 B1 | 10/2001 | Fertitta, III et al. | |
| 6,371,852 B1 * | 4/2002 | Acres ......................... | 463/25 |
| 6,431,983 B2 | 8/2002 | Acres | |
| 6,896,618 B2 * | 5/2005 | Benoy et al. ................... | 463/25 |
| 7,022,017 B1 * | 4/2006 | Halbritter et al. ............. | 463/42 |
| 7,240,022 B1 * | 7/2007 | Bistriceanu et al. ...... | 705/14.19 |
| 2002/0016202 A1 | 2/2002 | Fertitta, III et al. | |
| 2002/0103027 A1 | 8/2002 | Rowe et al. | |
| 2002/0111815 A1 * | 8/2002 | Smith ............................ | 705/1 |
| 2002/0177480 A1 | 11/2002 | Rowe | |
| 2003/0013527 A1 | 1/2003 | Rowe et al. | |
| 2003/0027631 A1 | 2/2003 | Hedrick et al. | |
| 2003/0027635 A1 * | 2/2003 | Walker et al. ................. | 463/40 |
| 2003/0028480 A1 | 2/2003 | Rowe | |
| 2003/0032474 A1 | 2/2003 | Kaminkow | |
| 2003/0054868 A1 | 3/2003 | Paulsen et al. | |
| 2003/0054878 A1 | 3/2003 | Benoy et al. | |
| 2003/0069071 A1 | 4/2003 | Britt et al. | |
| 2004/0002386 A1 * | 1/2004 | Wolfe et al. ................... | 463/42 |
| 2004/0092305 A1 * | 5/2004 | George et al. ................. | 463/29 |
| 2004/0127284 A1 * | 7/2004 | Walker et al. ................. | 463/30 |
| 2007/0117623 A1 * | 5/2007 | Nelson et al. ................. | 463/29 |
| 2008/0154725 A1 * | 6/2008 | Flake et al. ................... | 705/14 |
| 2008/0214295 A1 * | 9/2008 | Dabrowski ................... | 463/25 |

\* cited by examiner

*Primary Examiner*—Peter DungBa Vo
*Assistant Examiner*—Frank M Leiva
(74) *Attorney, Agent, or Firm*—Armstrong Teasdale LLP

(57) ABSTRACT

Uncarded play can be monitored by a gaming device or network to target incentives aimed at achieving player tracking system enrollment. A player is permitted to begin gaming device play. The player's play is monitored for triggering events suggesting a player's value to the casino and prompting notification of join-up incentives to the player. The player can be solicited to enroll and can be awarded join-up incentives following enrollment.

37 Claims, 5 Drawing Sheets

SYSTEM FOR JOIN-UP INCENTIVE MESSAGING AND BONUSING

TECHNICAL FIELD

This disclosure relates to networked gaming devices, and, more specifically, to a system for promoting player loyalty using a player tracking system achieving increased membership through incentive messaging and bonusing.

BACKGROUND

Gaming machines and gaming machine establishments like casinos are popular entertainment, attracting both infrequent and frequent visitors. Modern gaming machines are networked together, which allows accounting functions such as game tracking, player tracking, and bonusing. Visitors, or players, who identify themselves to the gaming network by becoming loyalty card holders accumulate bonus points as their play is tracked. Casinos benefit from knowing the identity of players and their frequency of play because player-specific marketing initiatives can increase player participation resulting in greater revenues to the casino. However, not all players choose to become loyalty card holders.

Traditional methods to entice players to make their identities known in exchange for participation in a player tracking or loyalty system have achieved some, although not overwhelming, success. Present methods include approaching players as they enter a casino and offering them various incentives for joining the player tracking system. However, casino staff shortages and time delays discourage some players from joining. Another widely-used method has been to place a casino host or hostess to the play area of the casino to visually observe players as they play to attempt to identify players with perceived value to the casino. For example, a host may attempt to estimate the number of plays a given player has made by monitoring monetary input or the length of time the player has played at an individual or group of machines. However, this type of estimation is unreliable and is based upon subjective criteria.

Other obstacles to full participation in player tracking systems include infrequent visitors, privacy issues, and player superstition. An infrequent visitor to a particular casino might view the time spent in registering with the player tracking system as wasted time. Others might feel that providing identification for registration would lead to a loss of privacy if marketing efforts were directed to a shared address or if the accumulated information were to become known by others. Additionally, some players might be suspicious of a casino's efforts to track their play and suppose that such tracking could affect the outcome of subsequent games.

Embodiments of the invention address these and other deficiencies in casino gaming systems.

BRIEF DESCRIPTION OF THE DRAWINGS

The description may be best understood by reading the disclosure with reference to the accompanying drawings.

DETAILED DESCRIPTION

Embodiments of the invention include a player tracking system that solicits registration of uncarded or unenrolled players in various ways. Registration can be promoted, for instance, through offering credits, including funds, goods, or services over and above what casino pay tables require casinos to pay-out. Registration can also be promoted, for instance, by showing players what credits they could have earned had they been carded or enrolled players at the onset of their play.

The tracking of uncarded players can provide useful information to casinos in their efforts to encourage participation in the player tracking system. For example, casinos can identify those players having particular value to the casino based on a number of factors including: win/loss ratios, plays per visit, length of stay, and types of games played. By identifying those players of particular value to the casino, the casino can best direct its marketing initiatives. Additionally, where resources prevent the casino from being able to reach all uncarded players for possible registration in the player tracking system, the casino can concentrate its efforts on those players having the greatest value to the casino.

As used in this description, a pay table of a gaming device is the standard winnings paid or credited to the player by the device itself. A bonus award is machine credits either credited to a machine or credited to a player account by a bonus system, or bonus points credited to a player account by the bonus system. A system award is a benefit that is paid or credited to a player of a gaming device that is not based on either the pay table of the gaming device or a bonus award. Examples of system awards include a complementary meal or show ticket, a drawing ticket, or bonus points or machine credits not based on a gaming device pay table. Together bonus awards and system awards will be referred to herein as incentive awards.

Figure 1:
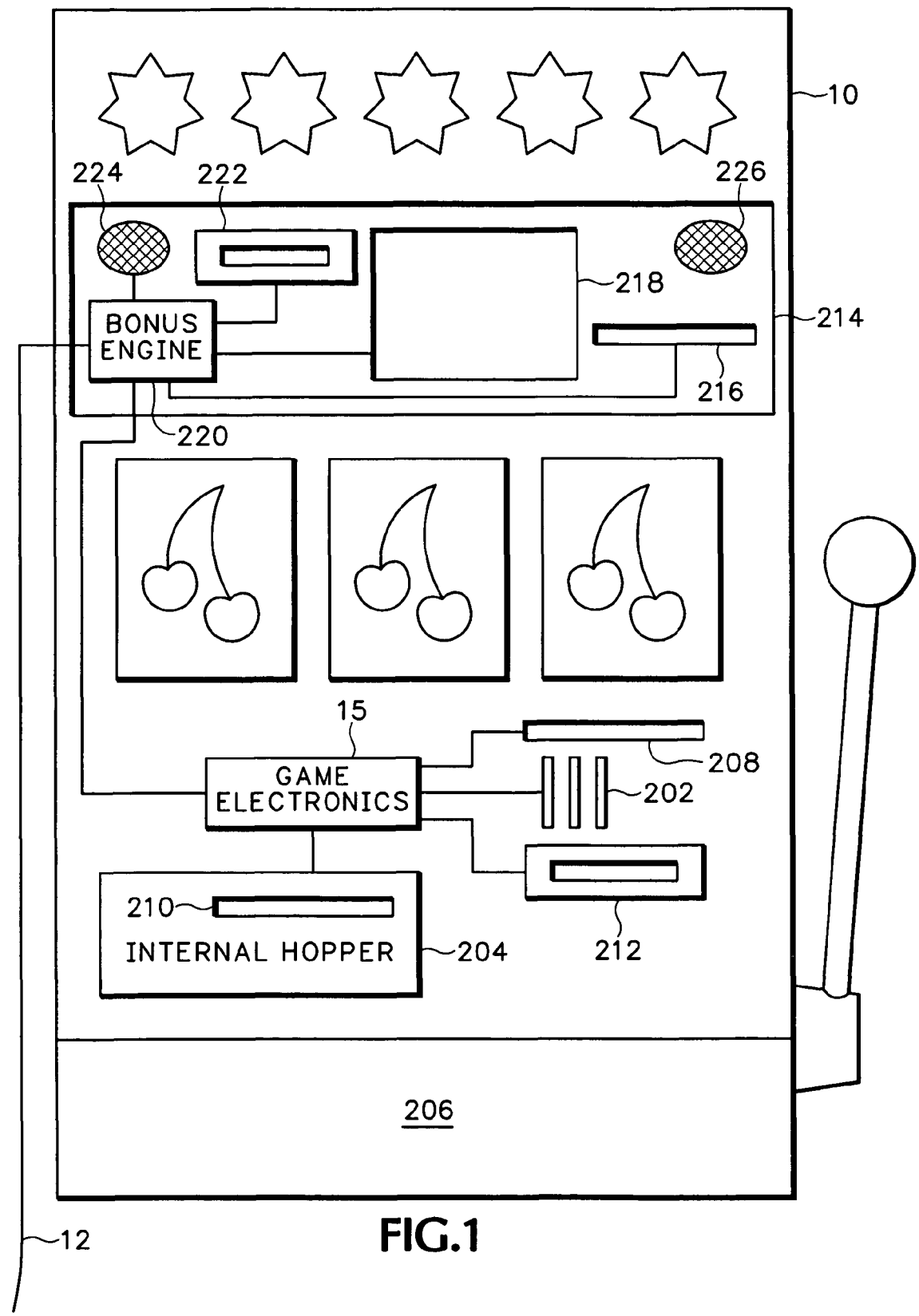
FIG. 1 is a block diagram showing a gaming device used for embodiments of the invention.

Turning to FIG. 1, an electronic gaming device ("EGM") 10 according to an embodiment of the invention is shown. The EGM 10 includes a bill acceptor 208 that accepts and validates bills, tickets or vouchers. Bill validators operate by scanning barcodes or other identifying features on tickets or vouchers, and by examining printing or other security features on paper currency to determine authenticity. Bill validators are well known in the gaming arts.

The EGM 10 also includes one or more coin slots 202 for accepting coins or tokens. An internal hopper 204 temporarily stores coins or tokens for later payment to the player through a payout bin 206, if the player chooses to cash out in such a manner. Bills can also be stored in a separate hopper, and dispensed to the player through the bill acceptor 208 or through another bill slot 210 in the machine cabinet, similar to an ATM machine.

A set of game electronics 15 manages the central operations of the gaming device 10. For example, the game electronics 15 counts the monetary value input into the EGM 10, and tracks and stores values for this and other data items. The game electronics 15 also control the game play of the EGM 10, such as by accepting user input from various buttons (not shown) to cause credits to be wagered, as well as cause motors to spin the game wheels, speakers to generate sound, and circuits to generate lights or video signals. The game electronics 15 may be a main board that interfaces with various controller boards that control specific functions in the EGM 10, or may control the various devices directly.

One of the items controlled by the game electronics 15 is an internal game printer 212. The game printer 212 can be of any type known in the art, such as impact, ink-jet, thermal, laser, and can be a color printer or standard black and white. Even if the game printer 212 is only capable of printing in a single color, cardstock or paper used by the printer could be preprinted in color.

The EGM 10 also includes game-mounted components of a player tracking system. The components are generally shown affixed to a frame 214, which is mounted to the gaming device 10. Although components of the tracking system interact with the EGM 10, it is a separate system from the gaming device.

The player tracking system includes a set of electronic inputs and outputs for interfacing with the player. For example, in the gaming device shown in FIG. 1, portions of the player tracking system mounted to the frame 214 include a cardslot with a card reader 216 and a touchscreen display 218. Alternate embodiments could use a traditional keypad, not shown. The display screen 218 may be a Liquid Crystal Display (LCD), for example. A detailed description of such a touchscreen display 218 is described in U.S. patent application Ser. No. 10/170,238, filed on Jun. 11, 2002, and is incorporated herein by reference for all purposes. As described in the Ser. No. 10/170,238 application, the bonus engine 220 manages the touchscreen display 218, and card reader 216, as well as provides the bonusing and other functions described above. A player of the gaming device 10 uses a card and/or a PIN code to identify himself or herself to the player tracking system. Monetary value can be entered into the game, either from the ID card itself, from a credit-card account with a bank or from a special gaming account managed by a casino. Alternatively, a player can use the card and/or PIN code to identify himself or herself, and then put credits on the machine by depositing coins, tokens, bills, or tickets/vouchers into the machine.

The card reader 216 and display 218 are managed by functions operating on a "bonus engine" 220, which is a specialized piece of hardware used in the player tracking network. The bonus engine 220 is coupled by a computer connection to the gaming network, and plays a central role in the player tracking system. The bonus engine 220 is in constant communication between the game electronics 15 and the gaming network. The bonus engine 220 receives constant status updates about the state and status of the EGM 10. The game electronics 15 may automatically send information to the bonus engine 220, such as "events", when the events occur, such as at the end of the game, or when a key event happens like a bill being accepted into the EGM 10. Or, the bonus engine 220 may send electronic updates, requests, or polls to the game electronics 15. When polled, the game electronics 15 sends the latest events to the bonus engine 220. Additionally, the gaming network can send commands and directives to a particular EGM 10 through the bonus engine 220 of that device. The bonus engine 220 then performs the commands, such as by displaying a message on the display 218, or the bonus engine delivers the commands to the game electronics 15 of that gaming device.

The EGM 10 further includes a system printer 222 and speakers 224 mounted to the frame 214 of the player tracking system. The system printer 222 and speakers 226 are also coupled to and managed by the bonus engine 220. The system printer 222 works in conjunction with the game printer 212 in that the system printer 222 prints the awards while the game printer 212 prints the traditional game cashout vouchers. The speakers 224 can be made to produce sounds or music by the bonus engine 220. Although the specific hardware included in the gaming device 10 is important in implementing embodiments of the invention, the invention can operate regardless of the type of components in the gaming device 10.

Although a system printer 222 and game printer 212 have been described, other printer configurations are possible and contemplated within the scope of the invention. For example, in another embodiment, a single printer, having two inputs, one from the game electronics 15 and the second from the bonus engine 220 receives, acts upon, and reconciles printing requests from both devices. In a similar embodiment, a single printer with a single input is routed through a device having two inputs, one for the game electronics 15 and the other for the bonus engine 220. In another embodiment, a single printer is coupled directly to the game electronics 15, with the bonus engine 220 coupled to the game electronics and not directly coupled to the printer. In this configuration, print commands originating from the game electronics are transmitted directly from the game electronics 15 to the printer. Print commands originating from the bonus engine are sent from the bonus engine 220 to the game electronics 15 and are then transmitted to the printer. In this way, the game electronics 15 perform a routing and reconciling function for the shared printer. In yet another embodiment, the bonus engine 220 and game electronics 15 reverse functions from the above example, and the bonus engine assumes the routing and reconciliation functions for the shared printer.

Figure 2A:
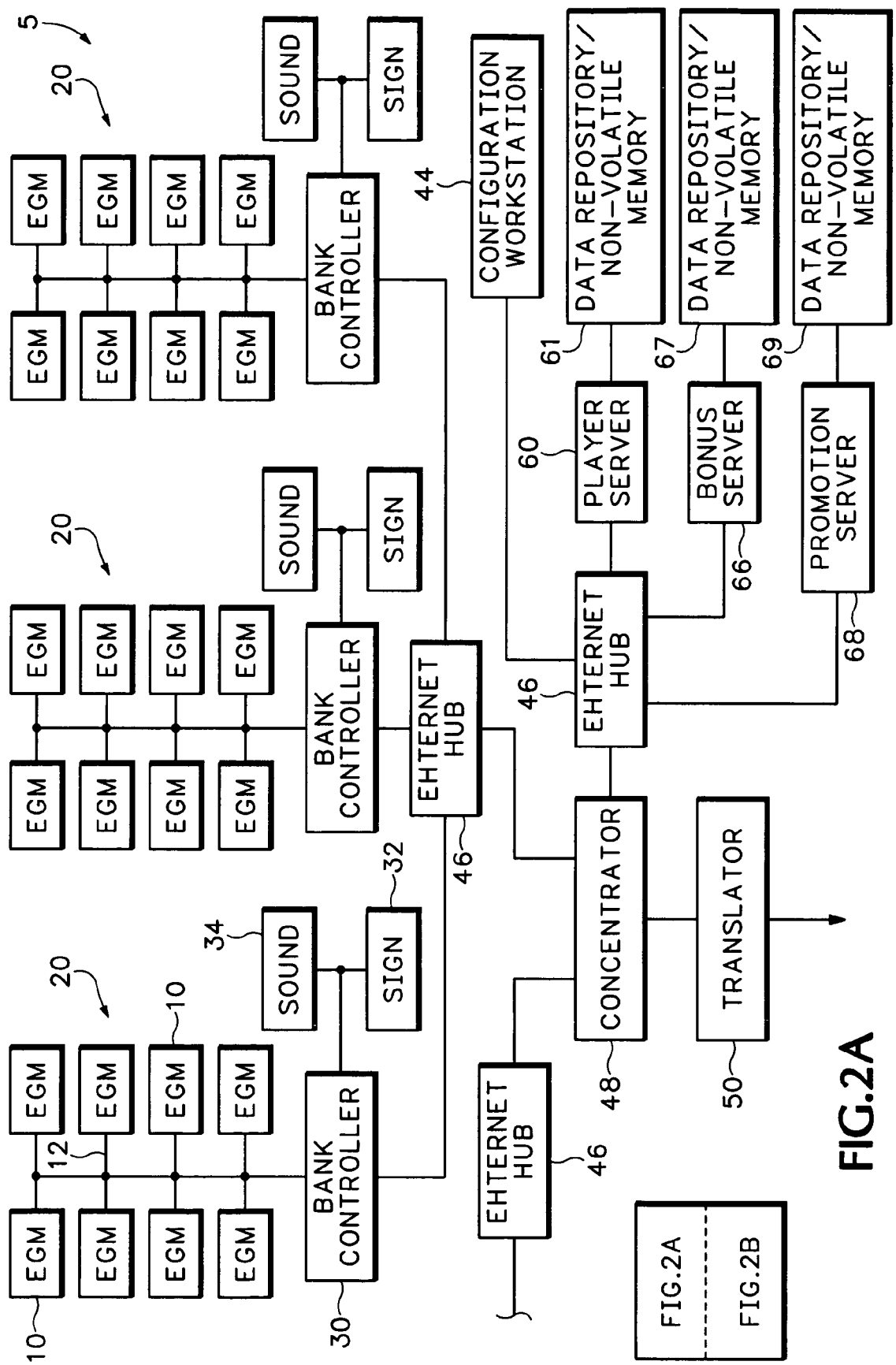
FIGS. 2A and 2B together are a block diagram showing components of a gaming network according to embodiments of the invention.
Figure 2B:
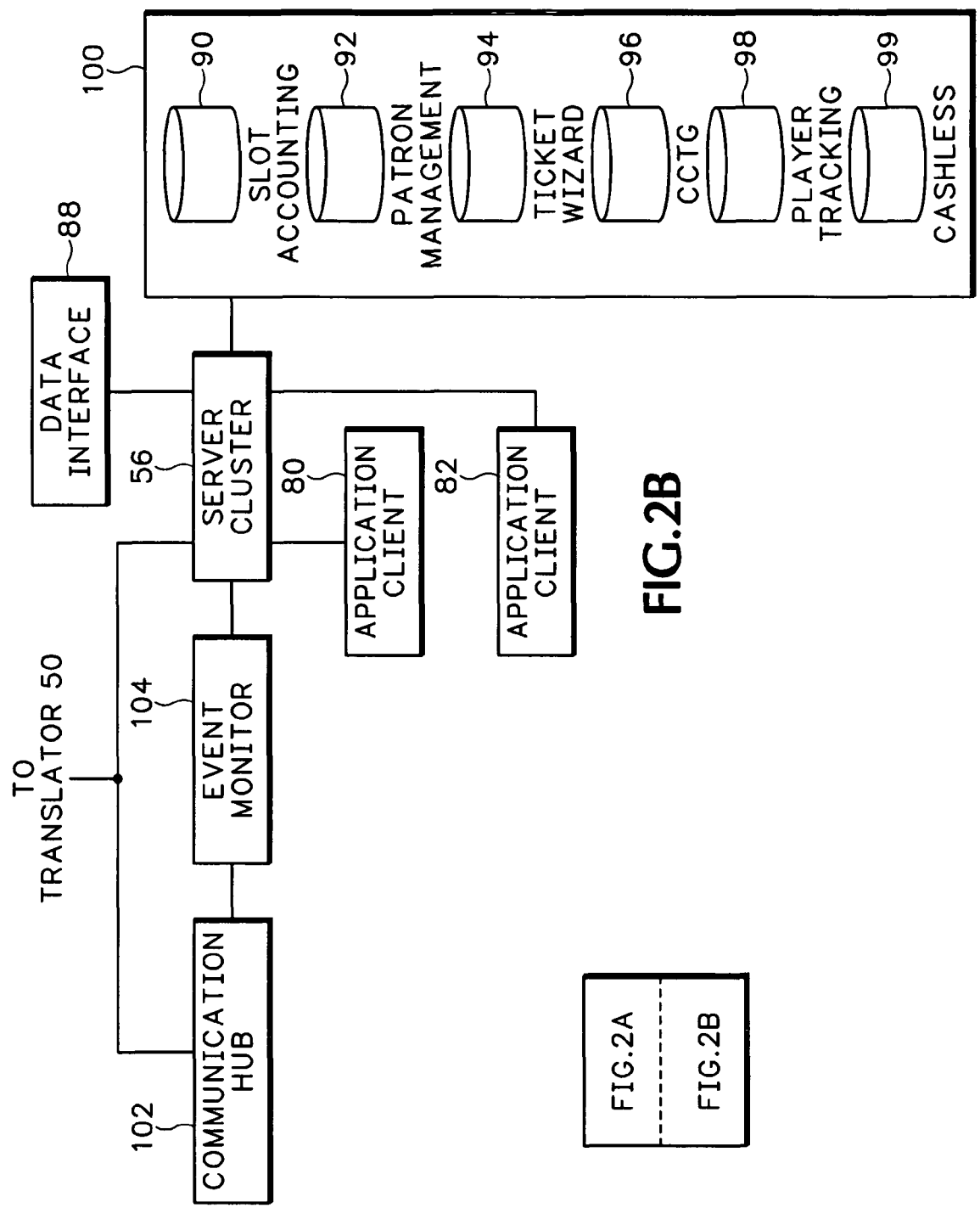

One such gaming network is illustrated in FIGS. 2A and 2B. In a gaming network 5, a number of EGMs 10 are organized in groups called banks. Individual banks 20, 22, and 24, can contain almost any number of EGMs 10. Additionally, any number of banks is possible in a gaming network 5. The gaming network 5 illustrated in FIGS. 2A and 2B is only an example gaming network. Those skilled in the art will appreciate that embodiments of the invention can operate on any acceptable network, even if it differs from the one illustrated.

Each bank is controlled by a bank controller 30, which is coupled to each EGM 10 by a communication cable 12. The bank controller 30 facilitates data communication between the EGMs 10 in its associated bank and the other components on the gaming network 5. In some embodiments, the bank controller 30 need not be present, and the EGMs 10 communicate directly with the other portions of the gaming network 5. The bank controller 30 can include audio capabilities, like an audio board or sound card for transmitting digitized sound effects, such as music and the like, to a sound system 34 coupled to the bank controller. Additionally, the bank controller 30 or sound system 34 may include a device for playing locally stored sounds, such as a hard-drive, CD or DVD-ROM drive. The bank controller 30 can also be connected to an electronic sign or screen 32 that displays information, such as scrolling, flashing, or other types of messages that indicate jackpot amounts and the like, which are visible to players of machines on a particular bank. These message displays 32, 34 may be generated or changed responsive to commands issued over the network 5 to the bank controller 30. The sounds and images created by the bank controller may be identical for each of the banks 20, 22, 24, or all of sounds and images created by the banks may be different than the others.

Configuration data for the gaming network 5 is stored in one or more network data repositories 61, 67, 69. In some embodiments, the data repositories 61, 67, 69 are made of battery backed-up non-volatile SRAM (Static Random Access Memory), which provides dual advantages of having extremely fast data input and output, and having a power source that is independent from the network 5 or the EGMs 10. The data repositories 61, 67, 69 may also be mirrored, i.e., duplicate copies are made in real-time. This prevents data from being lost if one of the battery sources should fail or other catastrophic event. Data may be stored in the data repositories 61, 67 69 using CRCs (Cyclic Redundancy Checks) and timestamps to ensure the data is valid and non-corrupt.

Configuration data is created at a configuration workstation 44 and stored in the data repositories 61, 67, 69. Configuration data may include message data for players as well as for promotions such as bonuses. Player message data is stored in the data repository 61, where it can be accessed by a player server 60. Player message data can include welcoming messages, card-in/card-out messages, and special messages about current promotions, for instance. The player server 60 reads the message data from the data repository 61 and sends a properly formatted message back to the bank controllers 30 and EGMs 10. These player messages may be displayed on a screen 32 for an entire bank, or may be shown on a screen directly mounted to the EGM 10 (not shown).

Other configuration data created at the configuration workstation 44 and stored in the data repositories 61, 67, 69 may include casino configuration data, such as identification of each EGM 10 on a casino floor. Additional parameters stored in the data repository 67, 69 are parameters used in promotions, such as bonus promotions. These parameters include such items as what EGMs 10 are included in the promotion, how to fund a bonus, i.e., if a bonus is funded by a portion of the coin-in amount of the EGMs 10, whether a paid bonus is to be taxed or non-taxed, and other parameters.

As players play the EGMs 10 in the gaming network 5, the EGMs send data from their coin meters, or meter values. One or more bonus server 66 stores these meter values, or summaries of the meter values, in its associated data repository 67.

The bonus servers 66 can also operate based on the present and stored meter values to determine an amount of money being wagered on the EGMs in near real-time. The bonus servers 66 can use the amount of money being wagered to calculate bonus pools that are funded as a percentage of the coin-in of participating EGMs 10. For instance, the bonus servers 66 can calculate a present amount of a bonus pool that is funded at one-half of one percent of the coin-in for the participating EGMs 10. An example of bonus promotions that can be operated from the bonus servers 66 includes LUCKY COIN and progressive bonuses, for example.

The promotion server 68, like the bonus server 66, can use an amount of money being wagered to calculate promotion pools funded as a percentage of the coin-in. Alternatively, the casino or operator can configure the promotion server 68 to award promotions not related to coin-in, for example, incentives for enrolling in player tracking programs. The promotion server 68 may include functions and processes operative to generate signals to cause a system award to be generated, and to communicate the generated system award to the particular EGM 10 at which the player receiving the award can receive the award.

In determining when to grant a bonus or system award, the promotion server 68 can access data stored anywhere on the network 5 looking for triggering events, such as: from any of the databases 100 described below; from any of the data repositories 61, 67, 69; from the bank controller 30; and from a bonus engine 220 (FIG. 1) on any or all of the EGMs 10 coupled to the gaming network.

When the promotion server 68 determines that a triggering event has been satisfied and that a system or bonus award should be generated, it sends appropriate signals to the bonus engine 220 of the appropriate EGM 10 through the gaming network 5 to deliver the award. Records of awards and bonuses may be maintained by the promotion server 68 or elsewhere in the gaming network 5 for tracking and accounting purposes.

Of course, the servers 60, 66, 68 could be embodied in a single device, or in other configurations, and do not have to appear as in FIG. 2A, which is only a functional representation. Likewise, the data repositories 61, 67, 69 could be embodied in a single device.

As data is generated by the EGMs 10, data is passed through communication hardware, such as Ethernet hubs 46, and a concentrator 48. Of course, switches or bridges could also be used. The concentrator 48 is also coupled to a translator 50, which includes a compatibility buffer so that the data from the EGMs 10 can be used by a server cluster 56 (FIG. 2B), and other parts of the gaming network 5. A communication hub 102, in turn, is connected to the translator 50 and to an event monitor 104. The event monitor 104 is also coupled to a server cluster 56 (FIG. 2B). The server cluster 56 may, of course, be embodied by more than one physical server box. In practice, including multiple server boxes with dynamic load sharing and backup capabilities of one another ensures the gaming network 5 is nearly always operational.

The server cluster 56 is attached to and manages several databases, such as a slot accounting database 90, a patron management database 92, a ticket wizard database 94, a "Cage Credit and Table Games" (CCTG) database 96, a player tracking database 98, and a cashless database 99. These databases are collectively referred to as the databases 100. Of course these databases 100 are only exemplary, and more or fewer databases can be part of the gaming network 5. In some embodiments, particular servers in the server cluster 56 manage a single database. For example, a single server in the server cluster 56 may manage the slot accounting database 90, while another server manages the patron management database 92. Such implementation details are well within the expertise of one skilled in the art. However, for ease of illustration, FIG. 2B shows a single server cluster 56 that is coupled to all of the databases 100.

In operation, the slot accounting database 90 receives and stores statistical and financial information about the EGMs, such as dates, times, totals, game outcomes, etc. The patron management database 92 stores information regarding identified players, such as how often and which games they play, how often they stay in the casino, their total loyalty points, past awards, preferences, etc. The ticket wizard database 94 stores data about tickets that are issued by the EGMs, such as payouts and cashout tickets, as well as promotional tickets.

The CCTG database 96 stores information about non-EGM 10 data in a casino. That data is typically generated by a client station (not shown) coupled to one of the bank controllers 30. The client station can be located in a casino cage or at a table game, for instance, and data generated by the client station is forwarded to the CCTG database 96 where it is stored. For example, data such as when and how many chips a customer buys, when a customer creates or pays off markers, when a customer cashes checks, etc. is stored in the CCTG database 96.

The player tracking database 98 is a subset database of the patron management database 92, and is used when data retrieval speed is important, such as for real time promotions and bonusing. The cashless database 99 stores information about payment options other than bills, coins, and tokens.

Application clients 80 and 82 couple to the server cluster 56, and can retrieve data from any or all of the databases 160. Application programs run on an application client 80, 82 to provide users information about the gaming network 5 and the casino in which the network is established and to cause functions to operate on the gaming network 5. An example application client 80 could include, for instance, an accounting server that allows queries and provides reports on financial and statistical information on single or groups of EGMs 10.

A data interface 88 presents a uniform interface to other applications and servers (not shown), and grants access to retrieve data from the databases 100. Typically these other clients or servers would not be controlled by the same entity that provides the other components of the gaming network 5, and therefore the data interface 88 grants only guarded access to the databases 100.

Figure 3:
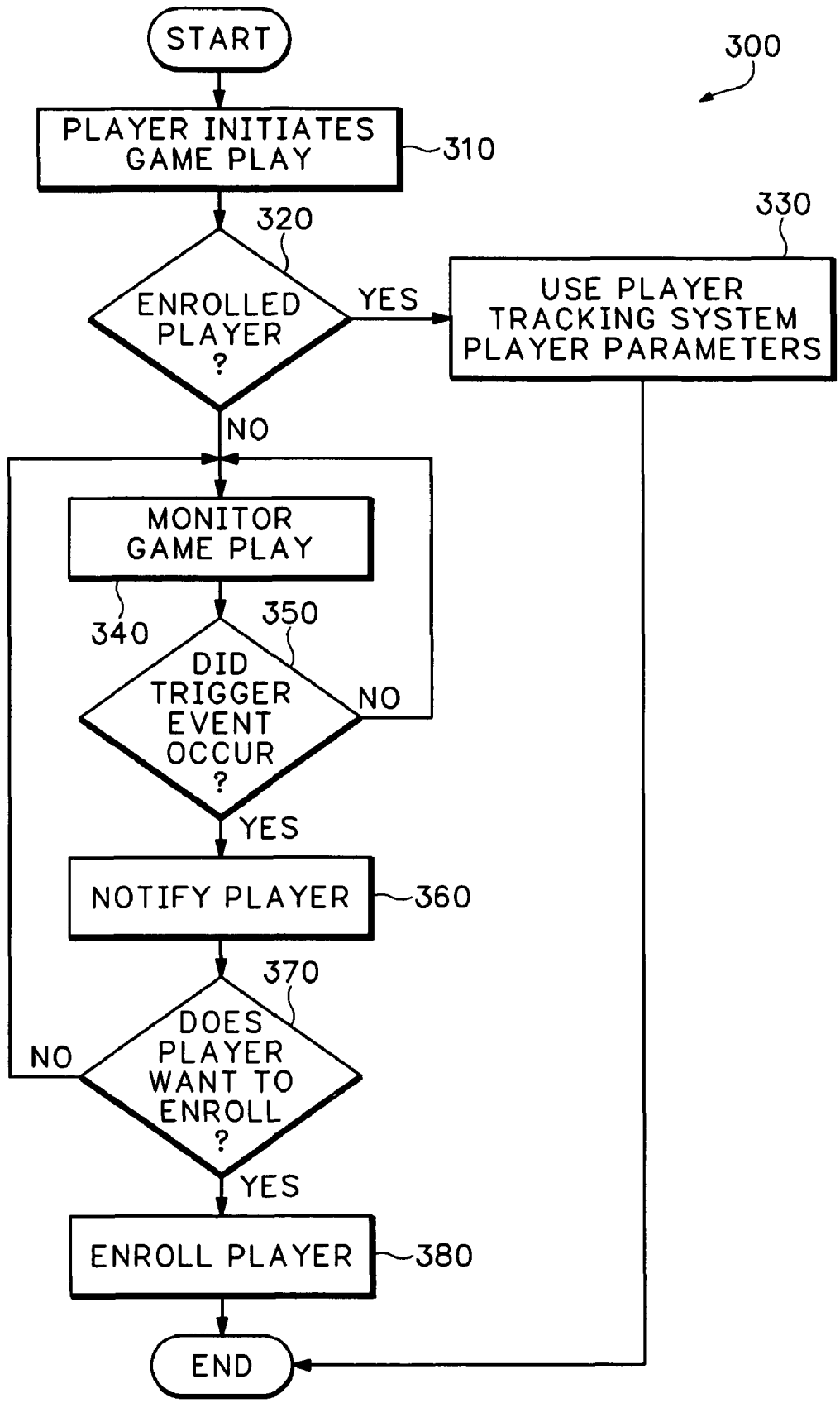
FIG. 3 is an example flow diagram showing example processes that can be performed by the network of FIGS. 2A and 2B.
Figure 4:
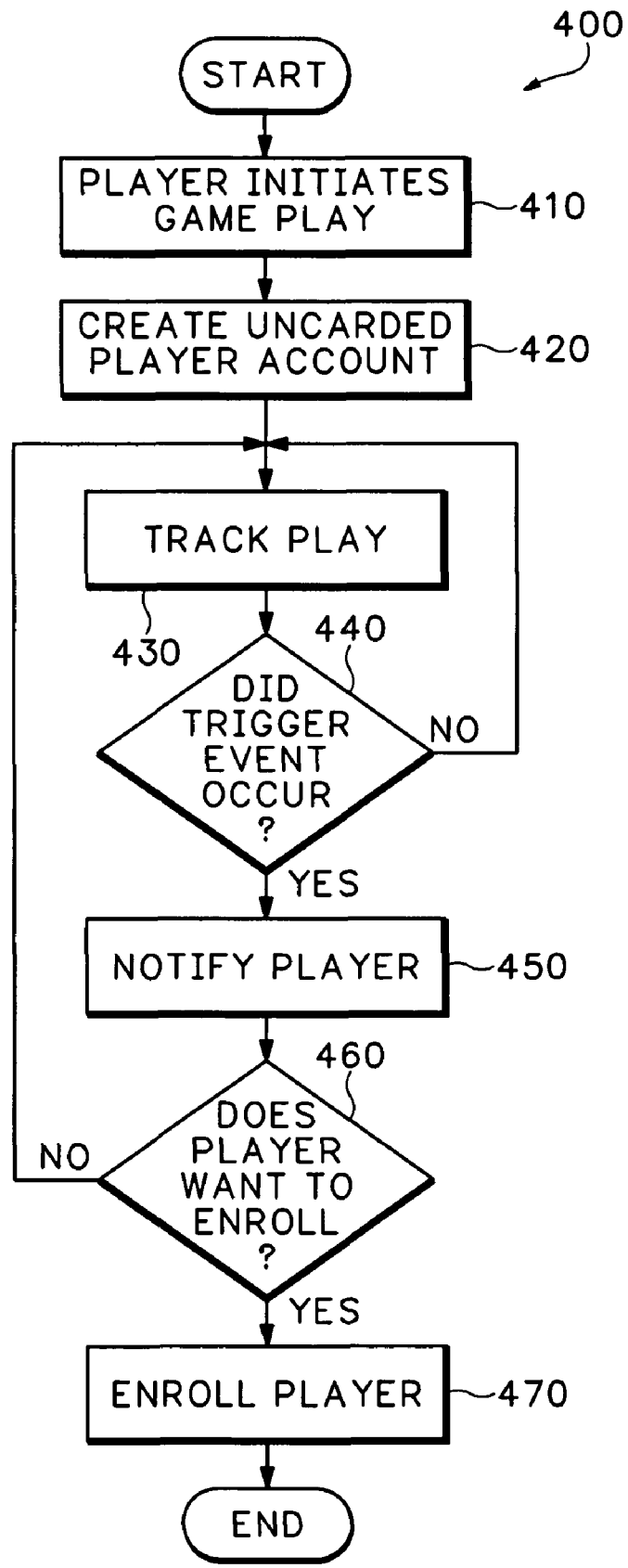
FIG. 4 is an example flow diagram showing additional example processes that can be performed by the network of FIGS. 2A and 2B, including the creation of an uncarded player account.

Details of how the system in FIGS. 2A and 2B identifies, notifies and enrolls uncarded or unenrolled players in the player tracking system are shown in FIGS. 3 and 4. FIGS. 3 and 4 are example flow diagrams illustrating processes that can be used by the system. For brevity, functions relating to messaging and incentive awards will be referred to as occurring on the promotion server 68, although they could be performed on either the promotion server, bonus server 66, bonus engine 220, or elsewhere in the gaming network.

In FIG. 3, a flow 300 begins at process 310 where a player initiates game play on an EGM 10 coupled to the gaming network 5. The EGM 10 need not be coupled to the network 5 in all embodiments. The player can initiate game play by entering coins or bills into the EGM 10, or by using a temporary account made functional through a temporary player tracking card and/or temporary personal identification number (PIN). The temporary account can, although need not, have an initial balance as a means of encouraging player tracking card enrollment.

Where a temporary account is established, play can be tracked across multiple play sessions over time. Play sessions are configured by the user using an algorithm or process. The algorithm or process can define a play session using inputs, credits on the machine, time since last wager, etc. Play can likewise be tracked across multiple machines. The tracked player data can be stored in the servers 60, 66, 68 or databases 100. Tracked data is associated with a unique account number not associated with a player name or identifier. As previously discussed, the temporary account can be activated by insertion of temporary player tracking card and/or temporary personal identification number.

At a decision 320 the network 5 checks to see if the player is already enrolled in the player tracking system. If the player has used a valid player tracking card to initiate play, the player is an enrolled player. Likewise, if the player enters a PIN number corresponding to a valid existing player tracking account, the player is an enrolled player. If a player is identified as an enrolled player, the player is tracked in accordance with the parameters of the player tracking system, as shown at decision 330.

If the EGM 10 fails to detect the presence of a player tracking card or PIN number corresponding to an existing player account, the EGM 10 begins monitoring game play at a process 340 for the occurrence of a triggering event. The promotion server 68 periodically reviews activity generated at the EGM 10 for events constituting a triggering event. The promotion server 68 continues to review game play until the player ceases his play or a triggering event is detected at a decision 350.

After a triggering event, described in greater detail below, has been detected the promotion server 68 generates a notice in a process 360 indicating the player is entitled to an incentive award. The notice can be made at the EGM 10, either visually or aurally, or through casino personnel who are notified by the promotion server 68 of the occurrence of the triggering event. For example, notification can be made via a touchscreen display, through an annunciator, through a flasher, overhead the gaming device, through audio associated with the gaming device, via public address, through tickets, or via casino personnel. The incentive award can be made immediately payable at the gaming machine 10 or the notice can inform the player that the incentive award is available following enrollment in the player tracking system.

The incentive award can be, for example, cashable credits, non-cashable credits, cash vouchers, comp vouchers, multiplied jackpots, player points, tickets, merchandise, free spins, or multiples of a last bet. Depending on the pre-set conditions established by the customer, the game, or the gaming network, the first occurrence of a triggering event can provide an immediate incentive award, while subsequent occurrences can be made contingent upon enrollment in the player tracking system, for instance. Further, all occurrences can be made contingent upon enrollment. Any number of combinations of providing access to the incentive are contemplated and within the scope of the invention.

At a decision 370 the player either chooses to and proceeds to enroll at a process 380 or opts not to enroll in the player tracking system. The player who chooses not to enroll following a given triggering event has the opportunity to enroll following subsequent trigger events, and the promotion server continues to monitor game play 340 for the occurrence of triggering events. The promotion server 68 continues to track incentive awards offered to the player for enrollment and may augment such awards for each triggering occurrence. Thus, the player electing not to take advantage of a first incentive award on a first trigger might decide after some future notice the total amount of incentive is now worth his time in enrolling in the player tracking system. Such incentives can be tracked through the temporary account or through the promotion server 68, for instance.

Following player notification, the system of FIGS. 2A and 2B runs an enrolling process that invites the player to enroll. The system allows the player to self-enroll at the EGM 10, at a stand-alone device or terminal associated with one or more gaming machines, or through the assistance of casino personnel. It is desirable for the casino to be able to confirm the identify of the enrolling player by reviewing personal identification, although such an identification review is not necessary. If a temporary account was used to initiate play, enrollment can be as simple as associating a player identity with the temporary account. Associating a player identity with the temporary account can include the use of a biometric device. If no temporary account is in effect, the player tracking account may require additional information.

Allowing the player to self enroll at the EGM 10 can be allowing the player to use a touchscreen or keypad to enroll. Alternatively, the player could be allowed to go to an unmanned terminal or kiosk to enroll. Additionally, a player could be permitted to enroll by going to a customer service desk, by being approached by casino personnel in response to a signal from the promotion server 68, or by allowing the player to call casino personnel for registration.

FIG. 4 is another example of a flow diagram illustrating processes that can be used by the promotion server 68 to generate messaging and incentive awards for encouraging player tracking system enrollment.

A flow 400 begins when a player initiates game play on an EGM 10 coupled to the gaming network 5. The player initiates play on a gaming device at a process 410. An uncarded player account is created at a process 420 if no player account has been identified by insertion of a valid player tracking card or input of a valid PIN. It is not necessary that the player initiate play at process 410 prior to the creation of the uncarded player account at process 420. The order of flow is irrelevant.

Following the initiation of play and creation of the uncarded or unenrolled player account, the promotion server 68 tracks the uncarded play 430. The uncarded play is continuously tracked and stored in memory accessible by the promotion server 68 until a triggering event is detected 440. Once a triggering event is detected, the player is notified that he is entitled to an incentive for enrolling in the player tracking system. That incentive can be applied to the uncarded player account immediately following the triggering event or can be applied to the account only after enrollment. Pre-set options of the customer, game, or gaming network determine when the incentive award is awarded and accessible to the player. For example, the incentive award can be made payable immediately, made payable only following enrollment, made payable the following day, made payable on the next visit, made payable after a given number of hours, made payable at a given location, made payable after playing a given number of games, made payable at a set time, made payable on a different game, made payable to winners only, made payable to eligible players, or made payable to players using different forms of payment.

After the player is notified of the incentive award, the player chooses to enroll at a decision 470 or elects not to enroll in the player tracking system. As discussed above, the notification can be made in many different ways. If the player chooses not to enroll, the uncarded or unenrolled play is continuously tracked until such time as the player ceases playing or enrolls in the player tracking system. User pre-sets can determine the number and frequency of notifications to the player. Some users may wish to reduce the number or frequency of notifications to a given player in order to prevent the player from becoming annoyed by the notifications. Others may wish to provide a given number of notifications or a given frequency of notifications because an incentive from a first triggering event may be insufficient to encourage enrollment. Each triggering event can provide a new and different incentive to be applied to the uncarded player account in order to provide greater levels of incentive to the player for enrolling in the player tracking system.

Following the notification and a desire by the player to enroll, enrollment can be made in any of the manners discussed with respect to FIG. 3.

Triggering Events

Generally, using the incentive award system described above, an incentive award is generated after an incentive triggering event occurs. As described above, a trigger event occurs when conditions caused by the customer, the game itself or gaming network satisfy one or more pre-set conditions. The pre-set conditions are "triggers," and when a trigger's conditions are satisfied, the trigger event occurs.

The triggers are typically static, such as awarding a complementary meal coupon when a player has a requisite amount of coin-in over a given period. Other triggers can be dynamic or based on dynamic variables, such as awarding a free return play to the top 10% of players in a casino or group of casinos over a given time period.

The triggers are used to ascribe value to players based upon criteria established by the customer, game, or gaming network. This ascribed value can be used to establish a player rating, the levels of which are defined through pre-set conditions. Player ratings can be based on lookup tables that correspond tracked player activity to predetermined player ratings stored on the player server 60, bonus server 66, promotion server 68, or related data repositories 61, 67, 69 or databases 100, for example.

A list of example groups of triggering events is listed below in Table 1.

TABLE 1

List of Trigger groups, by type:

| Machine Outcome | Player Behavior | Random Triggers |
| --- | --- | --- |
| Specific Game Outcomes | Points Earned | Lucky Coin |
| Series of Game Outcomes | Win/Loss Per Unit of Time | Lucky Time |
| Sets of Game Outcomes | Handle Per Unit of Time | Lucky Game |
| Consecutive Game Outcomes | Continuous Play | |
| X outcomes in N tries | | |
| Outcome sets/unit time | | |
| Outcomes relative to others | | |

Trigger Definitions:

A "Specific Game Outcomes" triggering event occurs when the player obtains a predefined result on a game on the gaming device. Examples include, for instance, a "four-of-a-kind" (or a particular four, such as four aces) in a poker game, "seven-seven-seven" in a slot game, or obtaining a particular bonus symbol on one of the reels. An award can be generated when any particular predefined outcome of the game is met.

A "Series of Game Outcomes" triggering event occurs when the player obtains certain results during multiple plays on the gaming machine device in a predetermined order. One example is where a player obtains, on a video poker machine, a pair, two pairs, three-of-a kind, straight, and flush, in that order but not necessarily consecutively. An award can be generated when any predefined series of results is met.

A "Sets of Game Outcomes" triggering event occurs when the player obtains certain results during multiple plays on the gaming machine regardless of order. Examples include a player receiving his/her fourth four-of-a-kind on a video poker machine, or a player obtaining jackpot payouts on each of the possible paylines in a slot-based game. An award can be generated when the last in the predefined set of results is met.

A "Consecutive Game Outcomes" triggering event occurs when the player obtains certain consecutive results during multiple plays on the gaming machine. Examples include a player winning on five consecutive hands or receiving two consecutive hands containing a minimum level of win (such as three-of-a-kind) on a video poker machine, or where a player receives a particular bonus symbol on the payline of a slot machine three consecutive times. An award can be generated when the last of the predefined consecutive game outcomes is met.

An "X Outcomes in N Tries" triggering event occurs when the player obtains certain results during multiple plays on the gaming machine within a certain number of tries. Examples include a player obtaining both a straight and a flush within five games of one another, but not necessarily consecutively or in that order, or where a player obtains seven-seven-seven during the first 50 plays of a particular slot machine. An award can be generated when the "xth" outcome is reached by the player.

An "Outcome Sets/Unit Time" triggering event occurs when a player obtains certain results during multiple plays on the gaming machine primary game within a set period of time. Examples include a player obtaining 10 jackpot awards on a slot machine within a ten minute period, and a player obtaining three flushes within a one-hour period on a video poker machine. This type of trigger allows the operator to specify the game outcomes and the time limit required for the trigger.

An "Outcomes Relative to Others" triggering event occurs when a player obtains a certain result or results on the gaming device before (or after) other players at a specified group of games. Examples include the player with the highest or lowest rank or rating of all uncarded or unenrolled players.

A "Points Earned" triggering event occurs when a player earns a certain number of points on the gaming device, such as: bonus points, Xtra credit points, or even machine credits. An award can be generated when such a minimum point level is met.

A "Win/Loss Per Unit of Time" triggering event occurs when a player obtains a certain number of wins or loses on a gaming device over a predetermined time period. Examples include a player losing 100 times over a 20 minute time period, or where a player wins 7 times over a one-minute period.

A "Handle Per Unit of Time" triggering event occurs for players betting a certain amount over a certain time period. Examples include a player betting at least a total of $500 at a slot machine over a one-hour period, or where a player bets his/her $1000^{th}$ coin at a nickel poker machine.

A "Continuous Play" triggering event occurs after the player has continuously played on a machine for a preset time period. For instance, the award might be triggered every ten minutes of play, or a super promotion after two hours of continuous play.

A "Lucky Coin" triggering event occurs for a player inserting the xth coin-in on a certain pre-designated portion of the games coupled to the gaming network 5. An award can be generated when the coin is inserted or credit otherwise transferred.

A "Lucky Time" triggering event occurs for a random player playing at a designated time of day.

A "Lucky Game" triggering event occurs for a random player who is playing on one of the gaming devices coupled to the gaming network 5.

These are only a small sample of potential triggering events that can be contemplated and the invention should not be so limited to those disclosed and described. Embodiments of the invention could conceivably use any data accessible anywhere in the gaming network 5 to create a trigger. The triggers could be as simple as to award system awards to everyone who is playing at 3:00 p.m. Friday to as complex as imaginable. A trigger may have a single component, such as that described above, or could have dozens of components (e.g.: a free spin to players who have a current coin-in level that is 15% higher than their coin-in average for the last hour if the player is playing at a game introduced in the last 4 months). The number of different triggers possible in the gaming network 5 is nearly infinite. Implementation overhead, however, may limit the casino to minimizing the number of components of a trigger, or the amount of calculation that has to be performed to check whether certain trigger conditions have been met.

Triggering events need not be applied uniformly to all of the gaming devices coupled to the gaming network 5, or to all of the players playing the gaming devices. There may be different triggering events or sets of triggering events for different groups of gaming devices. For example, with reference to FIGS. 2A and 2B, a first set of triggering events could apply to the EGMs 10 that are in bank 20, but not to those EGMs in banks 22 and 24. That is, there could be a triggering event implemented, such as generating a drawing ticket after "x" minutes of play, where "x" is 40 minutes for EGMs in bank 20, 50 minutes for EGMs in bank 22 and 60 minutes for EGMs in bank 24. Of course, although illustrated here as groups of EGMs associated with a particular bank, any of the EGMs 10 within the entire network 5 could have one or more triggering events that are different from any other EGM.

The same level of control extends to player groupings as well. For instance, certain triggering events could be set up for those players who have signed up for player tracking in the past 6 months, while another set of triggers applies to other players. Individual tailoring of a gaming network based on player identity is disclosed in copending application entitled "Player Specific Game System," filed Sep. 18, 2002 and having Ser. No. 10/247,786, which is assigned to the assignee of the present invention and incorporated herein by reference for all purposes. One way to tailor the gaming network is to have different triggers for groups of players, or for individual players themselves.

Using the system described with reference to FIGS. 2A and 2B and further described above in FIGS. 3 and 4, casinos can target particular players for join-up incentive messaging and bonusing based on the value of the player as defined by criteria established by the customer, game or gaming network. Such value can be ascribed to individual players or to a group of networked players based upon the occurrence of certain triggering events. The triggering events may result in notifications to given players based upon established conditions. The notifications can be made in a number of ways and providing incentives in response to such notifications can likewise be made in a variety of manners.

By varying the types of incentives made available to uncarded or unenrolled players, casinos can overcome traditional hurdles in achieving increased membership of desirable or valuable players. For example, once the incentive reaches a level high enough for a particular player, the player will be more likely to take the time to enroll in the player tracking system or inquire about membership, at which time the casino can allay fears regarding privacy concerns and superstitious beliefs.

Such player-specific mechanisms permit the casino to target the most valuable players for enrollment in player tracking programs. This type of direct solicitation results in enrollment of the players who contribute the most to the casino, rather than the player who is perceived to contribute the most. Likewise, soliciting enrollment based on value allows the casino to maximize personnel during peak hours. The result of objectively valuable player tracking enrollment is that casinos can direct their marketing efforts to the players whose activities most benefit the casino and substantially increase revenues thereby.

Thus, although particular embodiments for a join-up incentive messaging and bonusing system including tracking uncarded or unenrolled play have been discussed, it is not intended that such specific references be considered as limitations upon the scope of this invention, but rather the scope is determined by the following claims and their equivalents.

What is claimed is:

1. A method of registering an unenrolled player in a player tracking system, said method comprising:
    permitting the unenrolled player to play a gaming device using an uncarded player account;
    detecting a triggering event;
    notifying the unenrolled player after the occurrence of the triggering event;
    presenting the unenrolled player with a first set of enrollment incentives that the unenrolled player would have earned if enrolled in the player tracking system;
    allowing the unenrolled player to enroll in the player tracking system in response to an election by the unenrolled player to enroll in the player tracking system, wherein the unenrolled player is awarded with the first set of enrollment incentives after enrolling in response to the notification;

notifying the unenrolled player after the occurrence of a subsequent triggering event in response to an election by the unenrolled player not to enroll in the player tracking system, wherein a frequency of notifications to the unenrolled player is adjustable;

presenting the unenrolled player with a second set of enrollment incentives that the unenrolled player would have earned if enrolled in the player tracking system; and allowing the unenrolled player to enroll in the player tracking system in response to an election by the unenrolled player to enroll in the player tracking system after the subsequent triggering event, wherein the unenrolled player is awarded with the first set and the second set of enrollment incentives after enrolling in response to the notification of the subsequent triggering event.

2. The method of claim 1, wherein detecting a triggering event comprises detecting, by the player tracking system, that a triggering event has been detected and prompting a casino employee present at the gaming device to contact the unenrolled player.

3. The method of claim 1, wherein a plurality of unenrolled players play a plurality of gaming devices.

4. The method of claim 3, wherein the plurality of gaming devices are networked together.

5. The method of claim 4, wherein the triggering event corresponds to an unenrolled player among the plurality of players having a highest level of player rating.

6. The method of claim 4, wherein the triggering event corresponds to a randomly selected player among the plurality of players.

7. The method of claim 1, wherein the triggering event is a random occurrence.

8. The method of claim 1, wherein the triggering event is a predetermined occurrence.

9. The method of claim 1, wherein notifying the unenrolled player comprises soliciting the unenrolled player to enroll in the player tracking system.

10. The method of claim 1, wherein notifying the unenrolled player comprises visually notifying the unenrolled player.

11. The method of claim 10, wherein notifying the unenrolled player comprises notifying the unenrolled player through a display associated with the gaming device.

12. The method of claim 10, wherein notifying the unenrolled player comprises notifying the unenrolled player through an overhead sign.

13. The method of claim 1, wherein notifying the unenrolled player comprises aurally notifying the unenrolled player.

14. The method of claim 13, wherein the aural notification is emitted from the gaming device.

15. The method of claim 13, wherein the aural notification is emitted from a speaker remote to the gaming device.

16. The method of claim 1, wherein the unenrolled player is allowed to self enroll.

17. The method of claim 16, wherein the unenrolled player is allowed to enroll through a terminal on the casino floor.

18. The method of claim 17, wherein the terminal is unattended.

19. The method of claim 16, wherein the unenrolled player is allowed to enroll at the gaming device.

20. The method of claim 19, wherein the unenrolled player is allowed to enroll through a keypad associated with the gaming device.

21. The method of claim 19, wherein the unenrolled player is allowed to enroll through a display associated with the gaming device.

22. The method of claim 1, wherein the unenrolled player is allowed to enroll with the assistance of casino personnel.

23. The method of claim 22, wherein casino personnel approach the unenrolled player after the occurrence of the triggering event.

24. The method of claim 1, further comprising applying a credit to the newly enrolled player's account following enrollment.

25. The method of claim 1, wherein the uncarded player account is a temporary account.

26. The method of claim 25, wherein credit is applied to the temporary account.

27. The method of claim 26, wherein the unenrolled player is permitted access to the credit following enrollment.

28. The method of claim 27, wherein the credit is payable immediately.

29. The method of claim 27, wherein the credit is payable on a future visit.

30. The method of claim 27, wherein the credit is payable incrementally.

31. The method of claim 27, wherein the temporary account is associated with a player identifier.

32. The method of claim 1, wherein if the unenrolled player chooses not to enroll in the player tracking system, said method further comprises:

tracking continued play of the unenrolled player; and offering alternative enrollment incentives for enrolling based on the continued play.

33. The method of claim 32, wherein offering alternative enrollment incentives comprises offering a predetermined number of enrollment incentives.

34. A player tracking system for uncarded players, said player tracking system comprising:

a network;

a plurality of gaming devices interconnected via said network; and at least one server coupled to said plurality of gaming devices via said network, wherein said at least one server is configured to:

track uncarded play of unenrolled players having uncarded player accounts;

store the tracked uncarded play in a memory;

detect an occurrence of a triggering event;

notify at least one of the unenrolled players after the occurrence of the triggering event;

present the unenrolled player with a first set of enrollment incentives that the unenrolled player would have earned if enrolled in said player tracking system;

enable the unenrolled player to enroll in said player tracking system in response to an election by the unenrolled player to enroll, wherein the unenrolled player is awarded with the first set of enrollment incentives after enrolling in said player tracking system;

notify the unenrolled player after the occurrence of a subsequent triggering event in response to an election by the unrolled player not to enroll, wherein a frequency of notifications to the unenrolled player is adjustable;

present the unenrolled player with a second set of enrollment incentives that the unenrolled player would have earned if enrolled in the player tracking system; and allow the unenrolled player to enroll in the player tracking system in response to an election by the unenrolled player to enroll in the player tracking system after the subsequent triggering event, wherein the unenrolled player is awarded with the first set and the second set of enrollment incentives after enrolling in response to the notification of the subsequent triggering event.

35. The system of claim 34, wherein said at least one server is further configured to enroll the at least one unenrolled player in said player tracking system.

36. The system of claim 34, wherein said at least one server is further configured to award a bonus.

37. The system of claim 34, wherein said at least one server is further configured to notify the at least one unenrolled player to enroll in said player tracking system.

* * * * *